G. S. CLEMENTS.
FAUCET.
APPLICATION FILED FEB. 2, 1912.

1,049,673.

Patented Jan. 7, 1913.

WITNESSES

INVENTOR
George S. Clements.
By Wm. C. McIntire Attorney

UNITED STATES PATENT OFFICE.

GEORGE S. CLEMENTS, OF BELLEFONTE, PENNSYLVANIA, ASSIGNOR OF ONE-HALF TO FRANK P. BARTLEY, OF BELLEFONTE, PENNSYLVANIA.

FAUCET.

1,049,673.  Specification of Letters Patent.  Patented Jan. 7, 1913.

Application filed February 2, 1912. Serial No. 674,999.

*To all whom it may concern:*

Be it known that I, GEORGE S. CLEMENTS, a citizen of the United States, residing at Bellefonte, in the county of Center and State of Pennsylvania, have invented certain new and useful Improvements in Faucets; and I do hereby declare the following to be a full, clear, and exact description of the invention, such as will enable others skilled in the art to which it appertains to make and use the same.

This invention relates to spigots, and has for its object to provide a means whereby the flow of water through the spigot may be shut off independent of the spigot valve.

Heretofore in the construction of spigots, it has been necessary, when it is desired to replace a washer surrounding the valve stem of the spigot valve to cut off the water from the building or pipe to which the spigot is attached, in order to eliminate waste of the liquid. By the provision of the present invention the body of the spigot may be turned slightly, thereby cutting off the flow of water therethrough, and permitting the valve stem to be removed and a new washer placed therearound.

From the foregoing it may readily be seen that washers may be changed upon the individual spigots without in any way altering the flow of water through the remaining spigots, or the balance of the water system, thereby increasing the efficiency and durability of devices of this nature.

It is a further object to provide a means on the interior of the supply pipe to which the spigot is attached for preventing corrosion, wearing and other objectionable features between the spigot and the supply pipe.

Figure 1:
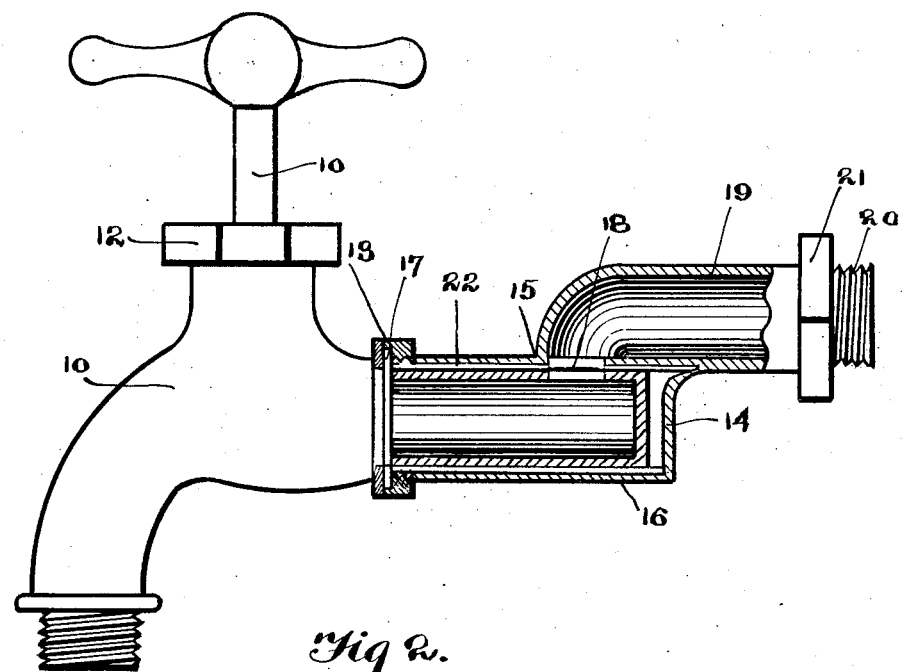
Figure 2:
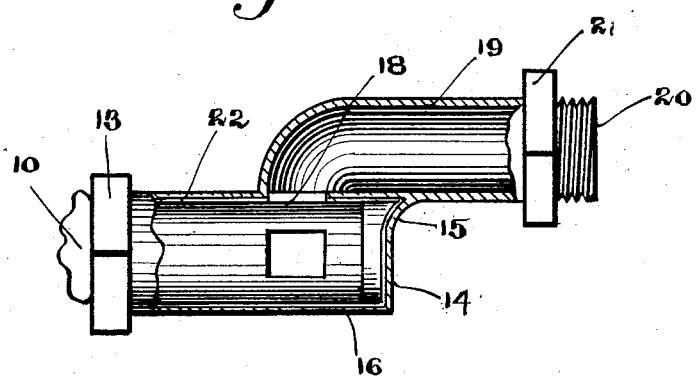

With the above and other objects in view, this invention consists in the construction, combination and arrangement of parts, all as hereinafter more fully described, claimed and illustrated in the accompanying drawings, wherein:

Figure 1 is a side elevation of a spigot constructed in accordance with the present invention, parts thereof being in section; and Fig. 2 is a section taken through the feed pipe and a portion of the spigot, illustrating the water shut off independent of the spigot valve.

The supply pipe which coöperates with the spigot forming the subject matter of the present invention has its outer terminal closed and curved slightly, and has a port formed in the under side thereof. An auxiliary supply pipe or cylinder is carried by the under surface of the faucet, and opens into said supply pipe through the instrumentality of the port aforesaid. The forward terminal of the cylinder or auxiliary supply pipe is exteriorly threaded to receive the offset nut carried by the faucet, which is adapted to coöperate with the cylinder aforesaid.

The faucet heretofore referred to is provided with a cylindrical valve projecting therefrom into the auxiliary supply pipe or cylinder heretofore referred to, said cylindrical valve being provided with the port which is adapted to normally register with the port in the under surface of the supply pipe which forms the connection between the auxiliary cylinder and supply pipe and the main supply pipe or cylinder. It is commonly known that lime water operated about two like surfaces causes corrosion between the said surfaces. In order to overcome this objectionable feature the auxiliary cylinder or supply pipe is provided with a white metal lining which overcomes the corrosive tendency between the two brass or copper surfaces.

Reference being had more particularly to the drawings, 10 indicates a standard faucet provided with the valves 11 secured to the faucet by the nut 12 in the usual and standard manner. The inlet side of the faucet 10 is provided with the offset internally threaded nut 13 which encircles the cylindrical valve 14, said valve projecting rearwardly from the faucet 10. This valve 14 is cylindrical in formation and is spaced from the interior of the nut 13 to permit said nut to secure the faucet to the supporting supply pipe, etc. The rear terminal of the supply pipe is closed, there being a port 15 formed in the upper side thereof through which the liquid is adapted to pass. Coöperating with the faucet 10 and secured thereto by means of the nut 13 is a cylinder or auxiliary supply pipe 16 exteriorly threaded at its outer terminal to be received in the nut 13 between the valve 14 and said nut. This cylinder or auxiliary pipe constitutes a housing or casing for the valve 14 and permits the same to rotate slightly therein without detaching the faucet from the cylinder. In order to prevent leakage and insure the positive engagement between the nut 13 and the cylinder or auxiliary supply pipe 16, a washer 17 is interposed between the outer terminal of the cylinder or auxiliary pipe 16 and the base of the depression formed between the nut 13 and the valve 14.

The upper surface of the cylinder or auxiliary supply pipe 16 is provided with the port 18 which is normally adapted to register with the port 15 of the valve 14, permitting the liquid to flow through said ports into the valve 14 and thence to the faucet 10. The main supply pipe 19 is formed integral with the cylinder 16 and extends above the same to a position such that the liquid flowing through the supply pipe 19 will be directed through the port 18, said supply pipe 19 terminating at the outer side of the port 18. The inner terminal of the pipe 19 is provided with a threaded teat 20 surrounded by a hexagonal projection 21 which provides a means for securing the faucet and entire structure to the supply pipe, not shown.

In order to prevent corrosive surfaces of the valve 14 and the cylinder 16, a white metal lining 22 is mounted within the cylinder 16, thus presenting two unlike surfaces to one another, thereby preventing corrosion should lime water pass through the faucet.

When it is desired to change the washer surrounding the valve stem 11 under the nut 12 without cutting off the flow of water through the building, the faucet 10 is given a quarter turn about the cylinder 16 through the instrumentality of the threaded engagement between the cylinder 16 and the nut 13. This causes the valve 14 to assume the position illustrated in Fig. 2, thereby removing the ports 15 and 18 from registration, and cutting off the flow of liquid therethrough. This permits the valve stem to be removed and repairs made therein.

Having thus fully described my invention, what I claim as new, and desire to secure by U. S. Letters Patent, is:

The combination with a faucet, of a valve operable therein, an auxiliary pipe comprising two sections closed at their inner ends, one section being mounted upon the outer section adjacent the inner ends thereof and communicating therewith, a cylindrical valve extending from said faucet and rotatably mounted within the lower section of said auxiliary pipe, the said cylindrical valve being spaced from the interior of said lower section and a white metal lining mounted within said lower section between said cylindrical valve, substantially as described.

In testimony whereof I affix my signature in presence of two witnesses.

GEORGE S. CLEMENTS.

Witnesses:
H. B. HERING,
A. P. ZERBY.

---

Copies of this patent may be obtained for five cents each, by addressing the "Commissioner of Patents, Washington, D. C."